United States Patent
Grau et al.

(10) Patent No.: US 7,553,563 B2
(45) Date of Patent: Jun. 30, 2009

(54) COMPOSITE MATERIAL CONSISTING OF INTERMETALLIC PHASES AND CERAMICS AND PRODUCTION METHOD FOR SAID MATERIAL

(75) Inventors: Stefan Grau, Blaustein (DE); Michael Scheydecker, Nersingen (DE); Karl Weisskopf, Rudersberg (DE)

(73) Assignee: Daimler AG, Stuttgart (DE)

( * ) Notice: Subject to any disclaimer, the term of this patent is extended or adjusted under 35 U.S.C. 154(b) by 673 days.

(21) Appl. No.: 10/546,133

(22) PCT Filed: Feb. 9, 2004

(86) PCT No.: PCT/DE2004/000221

§ 371 (c)(1),
(2), (4) Date: Aug. 19, 2005

(87) PCT Pub. No.: WO2004/074535

PCT Pub. Date: Sep. 2, 2004

(65) Prior Publication Data

US 2006/0078749 A1    Apr. 13, 2006

(30) Foreign Application Priority Data

Feb. 19, 2003    (DE)    ................ 103 06 919

(51) Int. Cl.
*B32B 9/00*    (2006.01)
*B32B 15/00*    (2006.01)
*B32B 18/00*    (2006.01)

(52) U.S. Cl. ............ 428/698; 428/539.5; 428/702; 428/697; 428/650; 427/449; 427/190; 427/191; 427/376.2; 427/376.3; 427/446; 419/10; 419/19; 419/12; 419/13; 501/153

(58) Field of Classification Search ........... 427/449, 427/190, 191, 376.2, 376.3, 446; 419/10, 419/19, 27; 428/698, 701, 702, 539.5, 613, 428/650, 472, 697, 699; 501/153
See application file for complete search history.

(56) References Cited

U.S. PATENT DOCUMENTS

| 6,025,065 | A  | * | 2/2000 | Claussen et al. | ......... 428/307.7 |
| 6,753,090 | B2 | * | 6/2004 | Haug et al. | ............... 428/472 |
| 6,803,078 | B2 | * | 10/2004 | Haug et al. | ............... 427/449 |
| 2002/0028342 | A1 | * | 3/2002 | Haug et al. | ............... 428/558 |
| 2002/0034643 | A1 | * | 3/2002 | Haug et al. | ............... 428/427 |

(Continued)

FOREIGN PATENT DOCUMENTS

DE    196 32 598    12/1997

(Continued)

*Primary Examiner*—John J. Zimmerman
*Assistant Examiner*—Aaron Austin
(74) *Attorney, Agent, or Firm*—Patent Central LLC; Stephan A. Pendorf

(57) ABSTRACT

The invention concerns a composite material consisting of intermetallic phases and ceramic, in particular in the form of a coating on metallic substrates, as well as an arc wire spraying process for production of the composite material in which the intermetallic phases and the ceramics to be deposited are newly formed during the deposit process from the components of the supplied wires by chemical reaction. The invention further concerns wear resistant layers formed by the composites, tribologic layers and plating or hard-facing materials.

22 Claims, 2 Drawing Sheets

U.S. PATENT DOCUMENTS

2004/0105939 A1 * 6/2004 Haug et al. ............ 427/446
2004/0202883 A1 * 10/2004 Scheydecker et al. .... 428/539.5

FOREIGN PATENT DOCUMENTS

| DE | 19706925 A1 * | 8/1998 |
| DE | 198 41 618 A1 | 3/2000 |
| EP | 0 426 608 A2 | 5/1991 |
| EP | 1 176 228 A2 | 1/2002 |

* cited by examiner

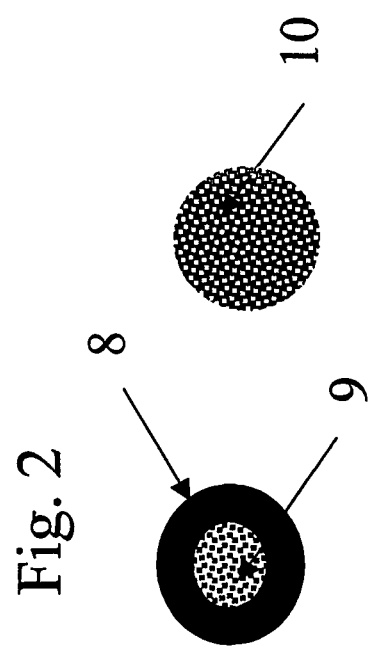
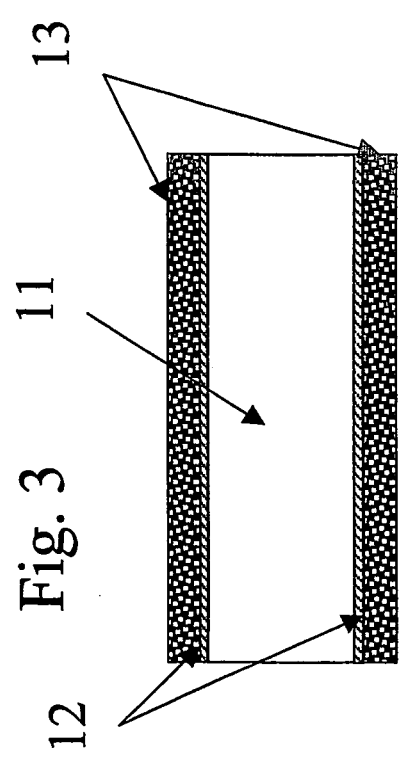

COMPOSITE MATERIAL CONSISTING OF INTERMETALLIC PHASES AND CERAMICS AND PRODUCTION METHOD FOR SAID MATERIAL

CROSS REFERENCE TO RELATED APPLICATION

This application is a national stage of PCT/DE2004/000221 filed Feb. 9, 2004 and based upon DE 103 06 919.4 filed Feb. 19, 2003 under the International Convention.

BACKGROUND OF THE INVENTION

1. Field of the Invention

The invention concerns a composite material comprising intermetallic phases and ceramic, in particular in the form of a coating on a metallic substrate, as well as an arc wire spraying process for production of the composite material in which the intermetallic phases and the ceramics to be deposited are newly formed during the deposit process from the components of the supplied wires by chemical reaction. The invention further concerns wear resistant layers formed by the composites, tribologic layers and plating or hard-facing materials.

2. Related Art of the Invention

In the production of material layers, the arc wire spraying process or the thermal spray process is characterized by a simple process management and high deposit rate. The coating of components close to their final contours of economical materials by means of arc wire spraying (LDS) satisfies many aspects of the requirements for production of series components and thus is broadly employed in series manufacture applications. The production of thin metallic layers constitutes the state of the art. For each spray pass (coating cycle) layer thicknesses of approximately 0.05 to 0.3 mm are achieved. Greater layer thicknesses must be prepared by multi-layer coating, that is, multiple coating cycles. LDS is one typical process for manufacture of thin layers.

Greater layer thickness, for example the possibility of the manufacture of entire components, can be accomplished by spray compacting by means of thermal spraying. Therein the materials are sprayed as powder or wire in a flame or an arc and processed into semi-finished components.

A disadvantage of the LDS spray layers and the spray compacting for production of layers and semi-finished products are, until now, the insufficient adhesion of the layers to the base material (substrate), the high brittleness, the high porosity and the inhomogeneities of the layers. Particularly disturbing is the tendency towards formation of cracks in thicker layers, that is, greater than 1 mm thickness.

The basic principle of LDS is at the time strongly limited by the selection of materials for formation of the layers, since the wire materials must be electrically conductive, as well as meltable under the process conditions. Thus, primarily only metallic materials are employed, as the case may be, metallic layers are produced. Ceramic high temperature materials are hardly utilizable in this process.

The particularly suited materials include composite materials of metal/ceramic, intermetallic/ceramic (intermetallic phases/ceramic) or intermetallic/metal.

From the Patent DE 198 41 618 C2 an LDS process for production of tribologic coatings of a metal/ceramic composite material for synchronizer rings is known. The wear resistant layer typically contains 40 wt. % $TiO_2$ and the metals Sn, Zn, Cu and/or Al. The porosity is approximately 20%. The deposit of this composite layer occurs preferably by spraying a filled wire comprising a metallic jacket of Cu and/or Al and a filling of $TiO_2$, as well as the metals Sn, Zn, Cu and/or Al. The $TiO_2$ ceramic content of the filled wire and deposited layer remain essentially unchanged. The high hardness with simultaneous high resistance to breakage (ductility) required for wear protective layers, semi-finished products for friction systems or protective platings for ballistic applications is not satisfactorily achieved by these composite materials. Likewise, the porosity is too high.

SUMMARY OF THE INVENTION

It is thus the task of the invention to provide a temperature stable and wear resistant component, or a corresponding material layer of a composite material, which exhibits high hardness with simultaneously high ductility, as well as an economical and rapid process for the manufacture or depositing thereof.

This task is solved by the provision of a composite material of intermetallic phases and ceramic phases, of which the components are at least partially newly formed by the high temperature reaction between one metal or the main component of a metal alloy and ceramic particles during deposit via LDS, as well as by an LDS process in which the at least one composite wire of metal or metal alloy and ceramic particles is employed in the manner such that, by the high temperature reaction between metal or metal alloy and ceramic particles during the depositing, spray particles with new intermetallic phases and new ceramic phases are formed.

The inventive LDS process includes therewith a reaction, in particular a high temperature reaction, between the individual components of the at least one supplied composite wire, so that newly formed materials exist in the deposited layer. The newly formed materials include intermetallic phases and ceramics. Therein the components can be supplied, besides by the at least one composite wire, also by further composite wires or by one or more solid wires, that is, purely metallic wires.

The reaction scheme for the main reaction during the LDS process between the metals or metal alloys and the ceramic particles can be summarized as follows:

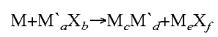

M: Metal (in certain cases as an alloy component)
M`: Metal
X: Non-Metal
$M`_aX_b$ and $M_eX_f$: Ceramic
$M_cM`_d$: Intermetallic phase (intermetallic)

One concrete example of a reaction is represented by the reaction between metallic aluminum and titanium oxide.

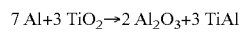

By the inventive LDS process the material combinations for the composite material are provided in a quality, in which they would in other ways not be obtainable. This applies in particular to high melting intermetallics and ceramics, as well as in particular measure to not unpyrolyzed meltable compounds.

The inventive composite material is provided, as a result of the manufacturing process, first as material layer. Since the material however can be deposited quasi unlimited in a substantially constant remaining quality, the layer thickness is in principle not limited. Therewith the layered thickness can be substantially above that of the thickness of the substrate. The so-called layer can thus also be viewed or considered as a stand-alone material or as the case may be a stand-alone component. In certain cases the substrate can also be completely removed, in order that the separated layer is obtained as separate component.

The inventive composite material contains as intermetallic phases (intermetallics), newly formed as a result of the LDS process, compounds of at least two elements of the group Al, Ti, V, Fe, Co, Ni, Cr, Mo, W, Si or B.

For systematic reasons also the corresponding binary or multinary silicides or borides are listed or included in the intermetallic phases, since according to the inventive reaction scheme in the LDS process silicides and borides are also obtainable from the metallic and ceramic components of the sprayed wire. Also, on the basis of their chemical characteristics, these compounds are closer to the intermetallics than to the typical ceramics.

Preferably the composite material includes one or more of the intermetallic phases titanium aluminide, titanium silicide, nickel aluminide, NiTi-intermetallics, molybdenum silicide and/or titanium boride. The indicated material coatings include all intermetallic phases occurring in the corresponding material system. Particularly preferred are the following compounds individually or in combination: TiAl, $TiAl_3$, NiAl, NiTi, $NiTi_2$, $NiTi_3$, $Ni_4Ti_3$, TiSi, $Ti_5Si_3$, MoSi, $V_5Si_3$, TiB, $TiB_2$.

The proportion of the intermetallics in the inventive composite material is above 20 vol. %. The content of intermetallics however preferably lies in the range of 30 to 80 vol. %.

Regarding the intermetallics occurring in the composite material, these need not be exclusively the intermetallics newly formed in the LDS process. The LDS process is likewise suited to co-deposit intermetallics which already exist in the spray wire. Their proportion is however outweighed by the proportion of the newly formed intermetallics formed in accordance with the invention. At least 70 vol. % of the intermetallics contained in the composite material are thus newly formed.

Further, the inventive composite material contains, as ceramic phases newly formed in the LDS process, oxides, nitrides, carbides, silicides and/or borides of at least one of the elements of the group Al, Ni, Fe, Ti, Co, Mo or W. Preferably the composite material contains at least one newly formed ceramic phase of Ti- or Al-oxide, or nitride, in particular $Al_2O_3$, AlN, $TiO_2$ or TiN.

Included among the newly formed ceramic phases are those which in certain cases are formed by a reaction or transformation between metal or metal alloy and the carrier gas or a reactive component of the carrier gas during the LDS process. These include in particular the oxides or nitrides which are formed by reaction with or transforming of the metal or the metal alloy with oxygen or nitrogen in the carrier gas. The typical composite formed in the high temperature reaction inherent in the inventive LDS process produced typical composite and the typical material characteristics are also achieved by the direct reaction between metal (or as the case may be metal alloy) and oxygen or nitrogen, since these reactions are also involved in high temperature reactions.

The proportion of the ceramics, in certain cases ceramic particles, in the inventive composite material is preferably below 80 vol. %. Preferably their content lies in the range of 20 to 70 vol. %. The ceramic component is therein comprised of the newly formed ceramics, as well as in certain cases residues of not transformed ceramic particles of the composite wire. In accordance with the invention the proportion of the newly formed ceramic is above 70 vol. % of the total ceramic content.

In a preferred embodiment the inventive composite material is built up essentially of Al containing intermetallic phases and $Al_2O_3$ containing ceramic phases, which are produced by a high temperature reaction between Al, the metal or metal alloy and an oxidizing ceramic powder. Particularly preferably the intermetallic phase is TiAl and/or $Ti_3Al$ and the ceramic phase is $Al_2O_3$.

Preferably the composition of the inventive material is so selected, that it includes only a small content of low-melting phases, in particular metals or alloys. This is naturally to be achieved by a high conversion of the employed metal or metal alloys with the employed ceramic particles. The maximal permissible content of metal in the deposited material depends upon the later purpose of employment, conventionally however lies below 10 vol. %. For wear protective layers or tribologic layers, metal contents of below 5 vol. % are preferred. In contrast to the conventional thermal spray process, in accordance with the inventive process it is also possible to obtain intermetallic/ceramic composite materials with metal contents of below 2 vol. %.

Preferably the composite materials exhibit a comparatively high density, as the case may be low porosity. For the employment as wear resistant layer, tribologic layer or protective plating the closed porosity is preferably below 5 vol. %.

In a particularly advantageous embodiment of the inventive composite material, at least 50 wt. % intermetallic phases are formed of titanium aluminides and at least 20 wt. % ceramic phases are formed of aluminum oxide. The content of metallic aluminum (meaning herein in particular not the Al found in intermetallics) lies therein below 2 wt. % and the closed porosity is therein maximally 5 vol. %.

The thickness of the inventive layer on the substrate, or also the unsupported layer, lies above approximately 0.05 mm. This lower value results from the lower-most or smallest technically useful deposit rate of the LDS process. The layer thickness preferably lies however above 0.5 mm.

The thickness of the material layer is dictated essentially by the desired purpose of use. In the case of the wear protective layer, the layer thickness preferably lies in the range of between 0.5 to 3 mm, for tribologic layers, for example as friction layer for brakes or clutch discs, preferably at 0.5 to 5 mm, and for protective plating, for example as armor material for ballistic applications, preferably at 3 to 50 mm.

As substrate for the depositing of the layer, all materials are considered suitable which also are suited for the known thermal spray processes. Typically the substrates are metallic materials or ceramic materials. Fiber-reinforced ceramics are particularly suited for this.

In certain cases it is useful to employ, between the substrate and the inventive layer, an intermediate layer for promoting adhesion or for balancing varying thermal physical characteristics. Preferably the intermediate layer is at least partially comprised of a metallic component of the metal or metal alloy supplied to the LDS process. Particularly preferred is when the intermediate layer is formed of the material which in the inventive LDS process reacts with or is transformable with the ceramic particles. For iron metal or steel substrates, Cr or Ni containing intermediate layers are particularly suited.

The inventive LDS process envisions employing at least one composite wire of metal or metal alloy and ceramic particles in the manner that, during the depositing, spray particles with new intermetallic phases and new ceramic phases are formed. The formation of these new compounds occurs therein essentially by a high temperature reaction between the metal or the metal alloy and the ceramic particles which are supplied via the at least one composite wire.

The inventive LDS process can be carried out with one wire as well as with two or more wires. The metallic components can be supplied therein by the at least one composite wire, as well as with also further composite wires or also by one or more solid wires, that is, purely metallic wires. The ceramic components are preferably supplied in the form of composite wires (metal/ceramic-composite wires).

An essential requirement for the carrying out of the LDS process is that the wire or wires exhibit a sufficient electrical conductivity for ignition of the arc.

Preferably two wires are employed wherein one first wire is metal or a metal alloy as solid (metal) wire and a second wire as composite wire.

BRIEF DESCRIPTION OF THE DRAWINGS

The following schematic drawings further explain the subject matter of the invention.

FIG. 2 Shows schematically a composite wire of a metal jacket (8) and a core (9) of ceramic powder and composite wire (10) of metal and dispersed ceramic phase.

FIG. 3 Shows a schematic of a cross section through a brake disc segment with a core (11) of gray cast iron, adhesive promoting layers (12) and composite material layers (13) which respectively are provided upon the two oppositely lying friction layers.

FIG. 4 Shows the schematic construction of an armor plate with graduated building-up of the composite material layer in cross section with a base plate (14) of steel and three composite material layers (13, 13', 13'') with varying composition, wherein the ceramic content increases in the sequence from (13'') towards (13') towards (13).

DETAILED DESCRIPTION OF THE INVENTION

Figure 1:
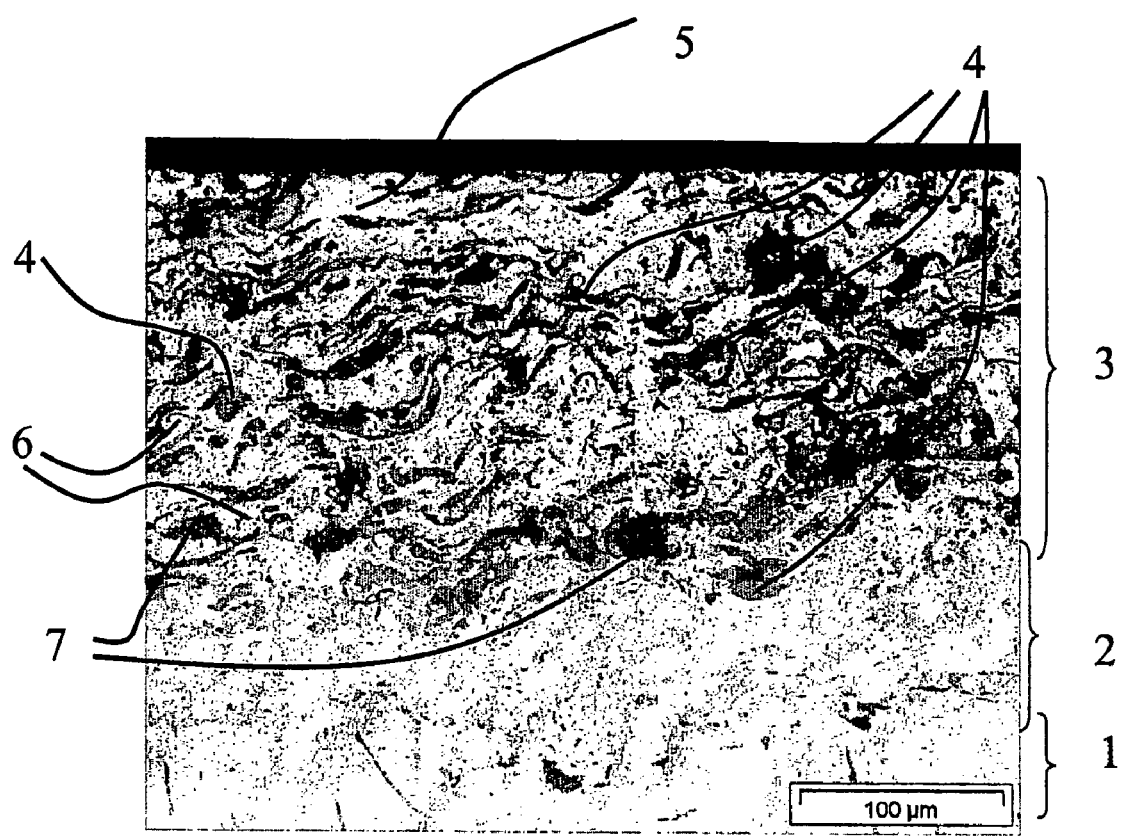
FIG. 1 Shows a micrograph of an inventive coating according to illustrative embodiment 1, with the substrate of grey cast iron (1), an adhesive layer (2) of $NiTi_5$ and a composite material layer (3), which includes phases of titanium aluminide and $Al_2O_3$ (4), $NiTi_5$ (5), nickel aluminide (6) and $TiO_2$ (7)

The composite wire (FIG. 1) is conventionally a metal shell 8 with ceramic core 9. Suitable composite wires can be produced in accordance with conventional processes. Thus, it is possible for example to produce the composite wire by stretching a ceramic-particle-filled metal jacket or by roller shaping a ceramic powder coated metal film. Likewise, metal wires with incorporated or embedded dispersed ceramic phases 10 are suitable.

The principle of LDS the process requires that at least one of the supplied wires has a sufficient conductivity in order to ignite the arc. In principle thus also combinations of at least one metal conductive wire and a poorly or not conductive wire would be suitable for carrying out the LDS process. Thus, the inventive LDS process also includes combinations of at least one conductive wire and, further, essentially ceramic comprising wires (ceramic wires). The ceramic wire can therein be comprised of pure ceramic, for example ceramic fiber or ceramic fiber bundles, as well as of adhesive-bound ceramic particles. As adhesives, organic polymers and/or metals can be employed.

For the inventive process, as starting components, those material combinations of metal and ceramic are particularly suited which in a high temperature reaction can be transformed or reacted with each other. Many of the suitable material combinations are known for example from the so-called SHS processes, "Self-propagating High temperature Synthesis". Therein the known syntheses include both pure solid/solid reactions as well as solid/gas reactions.

As metallic component of the composite wire, or as the solid wire, the elements Al, Ti, Si, V, Cr, Mo, W, Fe, Co or Ni, individually, in combination or as alloys are suited. Particularly preferred are Al, and Mg- and/or Si-containing Al-alloys.

As ceramic components of the composite wire, in particular the oxides of the element Ti, Zr, Fe, the nitrides of the elements Ti, Zr, Si, SiC, and the borides of the elements Si or Al are suited.

In accordance with the invention, the proportion of the ceramic component in the composite wire lies between 1 and 50 vol. %, particularly preferably between 20 and 40 vol. %.

Particularly preferred is the composite wire of an external metallic jacket 8 and a core 9 of ceramic particles, wherein the cross section of the core lies in the range of 20 to 60% of the total cross section.

As diameter and geometric design of the wire, the embodiments known for the conventional spray process are suitable. Preferably the composite wire is round and exhibits a diameter in the range of 1.2 to 5 mm.

The combination of metal or metal alloy and ceramic must in accordance with the invention be so selected, that a high temperature reaction is supported with formation of the new intermetallic and ceramic phases. Thus, the following metal (metal alloy)/ceramic combinations are in particular suitable, which can be employed individually or in combination:

| Metal Components | Ceramic Components |
|---|---|
| Al | $TiO_2$ |
| Ti | SiC |
| Ti | $Si_3N_4$ |
| Al | $Si_3N_4$ |
| Al | TiN |
| B | $TiO_2$ |
| NiAl | $TiB_2$ |
| Al, Ti | $TiO_2$ |
| Al, Ti | SiC |
| Al, Ti | $Si_3N_4$ |
| Al, Ti | $B_4C$ |
| Al, Ti | $B_2O_3$ |

In a further advantageous embodiment of the inventive process the metallic starting components are so selected, that these are also suited by reaction with each other to form new intermetallic phases. As further high temperature reactions occurring during the LDS process, there occurs the formation of intermetallics by transformation of metallic components. For this, the metallic components could be contained in the composite wire as well as in the solid wire. The combination of elements for formation of supplemental intermetallics suitable in particular in accordance with the inventive process are described in the following, wherein the corresponding elements can be supplied as metal or metal alloy in at least one composite or solid wire:

| Metal Component 1 | Metal Component 2 |
|---|---|
| Al | B |
| Al | Ni |
| Ti | Si |
| Ti | B |
| V | Si |

In a further embodiment of the invention a carrier gas is employed in the LDS process, which is suitable for reaction with at least one of the metallic components of the at least one supplied wire. As carrier gas in particular at least stoichiometric amounts of $O_2$, $CO_2$ or $N_2$ are employed, which can react with one of the metallic components, in particular Al or Ti for oxidation, carbonitriding and/or nitriding. The transformation of the metal and the reactive component of the carrier gas is therein supported by the simultaneously occurring high temperature reaction between metal and ceramic. By this alternative embodiment it is possible to further reduce the content of free metals. Since the free metals, such as for example Al, in general in the inventive composite material represent the component with the lowest melting point and with the lowest high temperature resistance, it is of substantial advantage to keep the amount of their component in the composite material as low as possible. Even under very optimal process conditions a complete transformation between the metal or metal alloy and the ceramic to the intermetallics and the new ceramic is not accomplished, so that metal residues or traces remain. The proportion of this metal residue can be further reduced by transformation or reaction with the reactive component of the carrier gas in the LDS process. The free metals are heated so long and to the extent by the high temperature reaction in the spray particles that they, at least in the outer surface zone of the particle, are converted to the corresponding oxides and/or nitrides.

In the use of the system with Al as metal and $TiO_2$ as ceramic preferably a small amount of $O_2$ component is supplementally added to the carrier gas, or the spray stream is so directed, that a certain mixing through with the $O_2$ containing environmental air can occur in the deposit zone of the spray particles.

As carrier gas, or as the case may be as the main component thereof, in general $N_2$ can be employed, since the nitride formation of the most inventive preferred metallic components in contrast to other transformations is kinetically inhibited, for as the case may be, the formation of the intermetallics of metal and ceramic occur substantially more rapidly and preferably.

The chemical reactions leading to the formation of the intermetallics is strongly exothermic and causes a very strong heating of the spray particles. The reaction partially continues also into the freshly deposited layer. This has the advantage, that the energy input via the LDS spray nozzle in the spray material can be reduced and that the particles remain in part liquid or soft even into the deposit zone. Thereby the particles can be deformed and can form a very dense metal layer. The deposited particles can, on the basis of their high temperature, also in part sinter together or weld together. In particular, material combinations which contain Al or Al alloys as metal components of at least one wire lead to comparatively dense layers.

The process leads in general to a porosity of the deposited composite material of less than 5 volume percent. The high material density (low porosity) achievable by the inventive LDS process provides a further great advantage in comparison to many of the conventional thermal spray processes.

The composition of the composite material is in particular adjusted by the relationship of the components supplied by means of the at least one wire. The adjustment of the relationship of the components to each other can occur in various ways.

The build up or, as the case may be, the composition of the composite wire, for example the relationship between metallic jacket and ceramic core.

Various diameters or cross sectional surfaces in the case of multiple wires.

Varying rates of feed in the case of multiple wires.

In general, a dosing or feeding of the individual components in precisely stoichiometric ratio is not necessary. Preferably, the metallic components are employed non-stoichiometrically, in order to reduce the residual content of free metal in the composite material. In comparison to this, the residue of non-transformed ceramic is in general substantially less damaging for the characteristics of the composite material, since even the starting ceramic exhibits as a rule clearly a better high temperature survivability and wear resistance than the metallic components. Preferably the components are supplied to the LDS process in such a ratio, that the residual content of free metal is below 5 vol. % and the residual content of not transformed ceramic is less than 10 vol. %.

It is particularly preferred to introduce the metallic and ceramic components via the wires in an amount relationship in the LDS process so that at least the metallic components are completely transformed to new ceramics and/or intermetallics.

In particular in the case of different supply speeds of the wires it is achievable in simple manner by the change of the speed during the deposit process to achieve a local change in the composition of the composite material, in particular a gradient configuration or build-up.

In one particularly advantageous embodiment of the invention, in a work process first a metallic adhesive promoting layer is deposited and thereupon the inventive composite material is deposited, wherein the chemical composition of the adhesion promoting layer gradually transitions into the composite material layer.

A further aspect of the invention concerns the use of the inventive composite material layers, or as the case may be the inventive composite material.

The composite material layers are exceptionally suited as wear resistant layers. In particular, layers are available which exhibit a combination of good tribologic and good wear resistance characteristics. These can be employed for example as friction layers for brakes, clutches and linings. Particularly suited therefore are the TiAl and $Al_2O_3$ containing composite materials. A particularly preferred application concerns brake discs of iron or steel with friction surfaces of the inventive composite material layer.

The combination of high hardness and ductility imparts to the composite material good resistance against ballistic influences. In particular the TiAl- and titanium silicide and/or titanium boride including systems are very suitable as ballistic protective armor plating. A particular advantage of the inventive process is that even complex shaped components or layers can be produced on complex shaped substrates in simple manner. This is in particular of interest for the armor plating of motor vehicles or in aviation, where complex subassemblies can no longer be protected usefully by conventional armor plates. The ballistic characteristics can be further improved by the employment of ceramic or fiber reinforced ceramic as substrate.

ILLUSTRATIVE EXAMPLE 1

This illustrative Example is concerned with the manufacture of a high capacity brake disc for motor vehicles. For this, the brake disc was produced by the combination of a conventional gray cast iron brake disc with a friction layer of a titanium aluminide/aluminum oxide composite material. A conventional gray cast iron brake disc was prepared for coating by sandblasting. For the LDS process two different wires were employed. Wire 1, the metallic wire, was comprised of conventional $NiTi_5$. Wire 2, the composite wire, was comprised of a metallic jacket and a ceramic core. The metallic jacket was formed by Al (purity greater than 99.5%) and the core by titanium oxide (TiO$_2$) particles (Rutil) with an average particle size in the range of 2 to 5 μm. The wire was composed of 72 wt. % of jacket material and 28 wt. % filler. The wire was obtained by stretching a titanium oxide particle filled aluminum metal jacket.

The diameter of both wires was 1.6 mm.

For coating, conventional LDS equipment was employed, wherein nitrogen was employed as carrier gas. In a first process variant the LDS process was first started with only wire 1 and a NiTi adhesive layer with a layer thickness of 0.1 mm was deposited. Thereupon the process was switched to depositing with the two wires. Therein the supply rate of the wires was so adjusted that the relationship of wire 2 (Al/TiO$_2$-composite wire) to wire 1 (Ni$_5$) in the reaction zone was approximately 20. By multiple passing over of the substrate with the spray jet a layer thickness of 1.5 mm was deposited.

The residual porosity of the deposited composite material layer, measured as closed porosity, was approximately 2 vol. %.

The micrograph of a cross section through the deposited layer is shown in FIG. 1. In the deposited layer (3) individual phases of titanium aluminide/Al$_2$O$_3$ (4) NiTi (5), nickelaluminide (6), and TiO$_2$ (7) can be seen. The phases exhibit an elongated structure and a very tight and dense packing, as is typical for the depositing of liquid mushy material. By the high temperature reactions in the particles a sufficiently high temperature continuing to the point of deposit is finally guaranteed or accomplished. On the micrograph no porosity is to be recognized within the deposited layer.

A further brake disc was produced with the same conditions except without the intermediate layer.

Both brake discs were ground planar and flat in conventional manner. The testing of the characteristics occurred in a friction evaluator using mass produced brake liners. The friction layers exhibited temperature resistance up to 1100° C. in air and showed good friction values, as well as an exceptional wear resistance.

ILLUSTRATIVE EXAMPLE 2

Illustrative Example 2 concerns the manufacture of a shaft of a spray compacted bolt provided with a wear resistant coating.

As base or substrate for building the bolt a steel plate with a ground surface was employed. Thereupon, by spray compacting in known manner in multiple layers, a bolt or stud is deposited.

The wear resistant protective layer was produced by the inventive LDS process with two wires. As wire 1 a conventional NiTi$_5$ wire with a diameter of 1.5 mm was employed. As wire 2 a composite wire comprised of 65 wt. % Al (purity 99.5%)and 35 wt. % titanium oxide (Rutil, with an average particle diameter of 2 to 5 μm) was employed. The Al formed a dense jacket for the core comprised of titanium oxide. The diameter of the composite wire was 2 mm. The two wires were supplied to the LDS-nozzle with the same and constant speed.

For examination of the material characteristics of the deposited composite material, the bolt and substrate were removed with machining from the layer. The remaining composite material layer was ground or honed. The mechanical characteristics of the composite material layer produced a hardness of 350 MPa and a breaking elongation of 0.35%.

The invention claimed is:

1. A process for producing a layer of a composite material of metallic, intermetallic and ceramic phases by depositing the layer forming components by means of arc wire spraying with at least one composite wire of metal or metal alloy and ceramic particles, wherein these composite wire components undergo reactions with each other during depositing forming intermetallic phases and new ceramic phases, wherein more than 70 vol. % of the ceramic particles undergo reactions during the spray processing with formation of intermetallic phases and new ceramic phases, and wherein the metal or the metal alloy of the composite wire reacts to the extent that unreacted metal or metal alloy constitutes less than 10 vol. % of the formed composite material.

2. The process according to claim 1, wherein additional metallic solid wire is employed, and wherein at least one of the metallic components of the solid wire reacts with a ceramic powder of the composite wire.

3. The process according to claim 1, wherein the development of exothermic heat as a result of the reaction continues in part also in the newly deposited layer.

4. The process according to claim 1, wherein the composite wire includes as metallic component at least Al, Ti, Ni, Fe, Co, Ni, Mo and/or W as metal or their alloys, as well as titanium oxide, zirconium oxide, boroxide, iron oxide, nickel oxide, silicium carbide, silicium nitride and/or borocarbide as ceramic component.

5. The process according to claim 1, wherein the composite wire comprises a metallic coating or jacket and a ceramic filler.

6. The process according to claim 1, wherein the composite wire includes a ceramic component of 20 to 40 vol. %.

7. The process according to claim , wherein during the arc wire spraying intermetallic phases of at least two elements from the group Al, B, Ni, Fe, Ti, Co, Mo, W, Si, B are newly formed in the spray particles.

8. The process according to claim 1, wherein during the arc wire spraying in the spray particles ceramic phases of aluminum oxide, titanium carbide, titanium boride, titanium silicide and/or titanium nitride are newly formed.

9. The process according to claim 8, wherein the reaction with the reactive gas leads to metal oxides and/or metal nitrides.

10. The process according to claim 1, wherein during the arc wire spray process reactive gasses are supplied, which react with at least one of the metallic components of the at least one supplied composite wire.

11. The process according to claim 1, wherein after the reaction to the new intermetallic phases or ceramic phases remaining free aluminum in the deposited layer is essentially converted to aluminum oxide.

12. A composite material of metallic, intermetallic and ceramic phases formed by depositing the layer forming components by means of arc wire spraying with at least one composite wire of metal or metal alloy and ceramic particles, wherein these composite wire components undergo reactions during depositing forming intermetallic phases and new ceramic phases, wherein more than 70 vol. % of the ceramic particles undergo reactions during the spray processing with formation of intermetallic phases and new ceramic phases, and wherein the metal or the metal alloy of the composite wire reacts to the extent that unreacted metal or metal alloy constitutes less than 10 vol. % of the formed composite material.

13. The composite material according to claim 12, wherein the intermetallic phases newly formed by arc wire spraying and deposited are comprised of at least two elements of the group Al, B, V, Ni, Fe, Ti, Co, Cr, Mo, W, Si or B.

14. The composite material according to claim 12, wherein the intermetallic phases include titanium aluminide, titanium silicide, nickel aluminide, NiTi intermetallics, molybdenum-silicide and/or titanium boride.

15. The composite material according to claim 12, wherein the ceramic phases deposited by the arc wire spraying include oxides, nitrides, carbides, silicides and/or borides.

16. The composite material according to claim 12 the ceramic phases newly formed and deposited by arc wire spraying include aluminum oxide, titanium carbide, titanium silicide, titanium carbide and/or titanium nitride.

17. The composite material according to claim 12, wherein a ceramic content of 10 to 70 wt. % and a content of intermetallic phases of 30 to 90 wt. %, as well as a porosity of less than 7 Vol. %.

18. The composite material according to claim 12, wherein it has a content of free metallic aluminum of less than 2 wt. %.

19. The composite material according to claim 12, wherein it is provided deposited in a thickness of greater than 5 mm on a metallic substrate.

20. The composite material according to claim 12, wherein said material constitutes a as friction layer for brake components or a wear resistant layer in motor vehicle.

21. The composite material according to claim 12, wherein said material constitutes a plating or protective layer against ballistic effect.

22. A composite material of metallic, intermetallic and ceramic phases formed by depositing the layer forming components by means of arc wire spraying with at least one composite wire of metal or metal alloy and ceramic particles, wherein these composite wire components undergo reactions with each other during depositing forming intermetallic phases and new ceramic phases, wherein more than 70 vol. % of the ceramic particles undergo reactions during the spray processing with formation of intermetallic phases and new ceramic phases, and wherein the metal or the metal alloy of the composite wire reacts to the extent that unreacted metal or metal alloy constitutes less than 10 vol. % of the formed composite material, characterized by
- at least 50 wt. % intermetallic phases of titanium aluminides;
- at least 20 wt. % intermetallic phases of nickel aluminides;
- at least 20 wt. % ceramic phases of aluminum oxide; and
- at most 5 vol. % closed porosity.

* * * * *